Dec. 23, 1958     J. D. DUTCHER ET AL     2,865,807
NYSTATIN PURIFICATION
Filed Jan. 6, 1955
PREPARATION OF CRYSTALLINE NYSTATIN
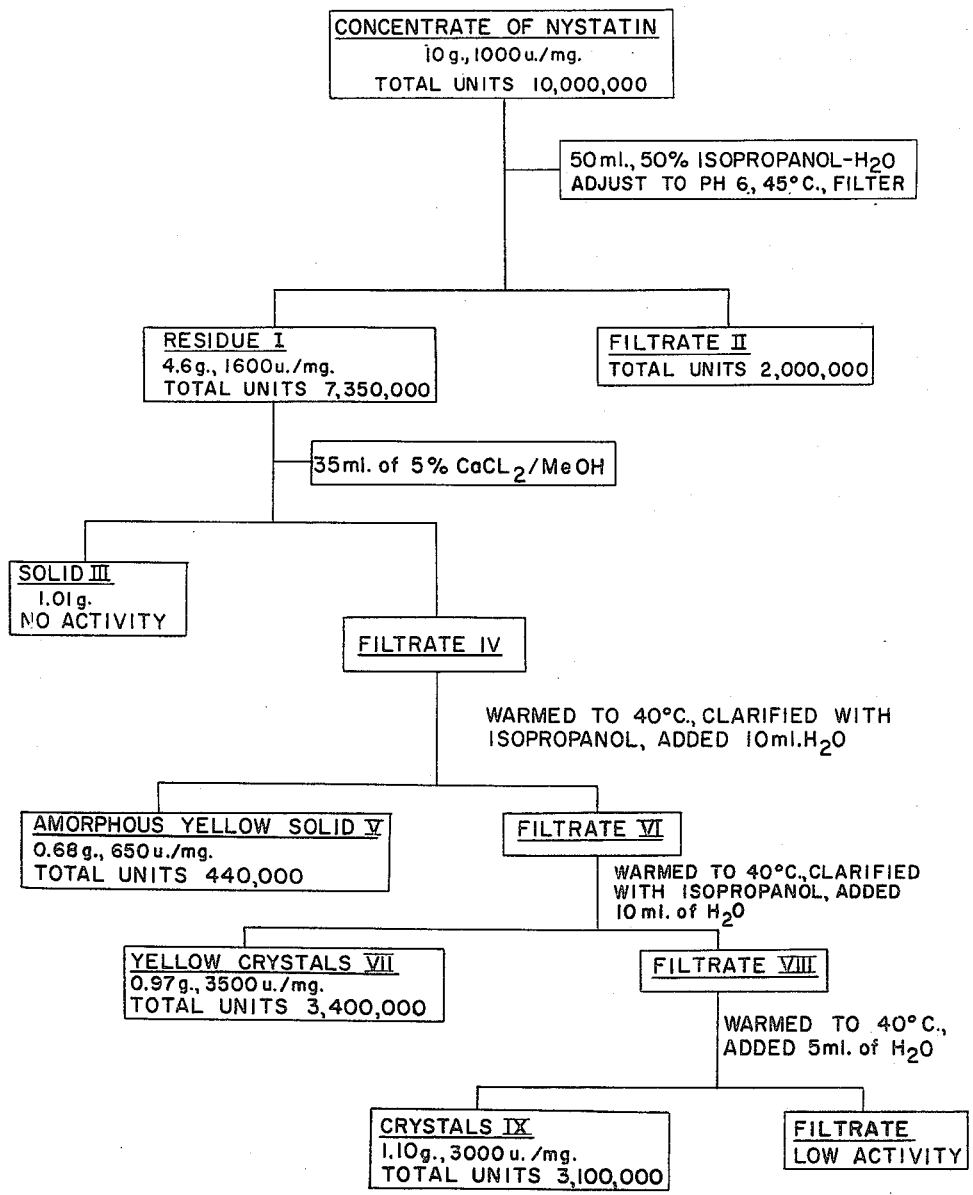

United States Patent Office 2,865,807
Patented Dec. 23, 1958

2,865,807

NYSTATIN PURIFICATION

James D. Dutcher, New Brunswick, and John Vandeputte, Milltown, N. J., assignors to Olin Mathieson Chemical Corporation, New York, N. Y., a corporation of Virginia Application January 6, 1955, Serial No. 480,278

10 Claims. (Cl. 167—65)

The present invention relates to the antifungal antibiotic fungicidin (nystatin). More specifically, the invention relates to improved processes of preparing crystalline fungicidin (nystatin).

The antibiotic fungicidin (nystatin) and its method of preparation from *Streptomyces noursei* are described in the copending application of Hazen and Brown, Serial No. 208,978, filed January 12, 1951, now abandoned. See also Hazen, E. L., and Brown, R., "Fungicidin, An Antibiotic Produced by a Soil Actinomycete," Proc. Soc. Exptl. Biol. Med. 76:93 (1950) and Brown, R., Hazen, E. L., and Mason, A., "Effect of Fungicidin (nystatin) in Mice Injected with Lethal Mixtures of Aureomycin and *Candida albicans*," Science 117: 609 (1953). The antibiotic is referred to hereinafter by the single term "nystatin."

Crude concentrates of nystatin can be prepared by extracting the mycelial mat with several portions of methanol and then processing the methanolic solution by fractional precipitation with ethyl acetate, washing the precipitate with 0.85% NaCl solution, re-dissolving in methanol and fractional precipitation with ether. See Hazen and Brown, Ser. No. 208,978, supra. Low yields of active crystalline material can be obtained from the resulting crude concentrates by distribution between butanol and saline and by partial precipitation from methanol. Crystalline nystatin of high purity has been obtained by distribution of partially purified nystatin concentrates in a biphasic system made up by mixing n-butanol, methanol, water and hexane and allowing this system to stand exposed to air evaporation until a crop of crystals collects at the interface. Dutcher, James D. et al, Antibiotics Annual, 1953–1954, pages 191–194, Medical Encyclopedia, Inc., New York, N. Y.

The processes described above produce crystalline nystatin but are objectionable due to the presence of impurities or low yields. They are also objectionable as they are relatively difficult to control and are not of the type desired in large-scale commercial operations.

In our research investigations in this field we discovered that crystalline nystatin could be readily prepared in accordance with the process described below.

Example I

Ten grams of a partially purified material containing 1000 u./mg. of nystatin was slurried with 50 ml. of a 50% isopropanol-water mixture. The resulting suspension was adjusted to pH 6 by addition of 20% $H_2SO_4$ and warmed at 45° C. for five minutes. The mixture was then filtered, yielding an insoluble residue (I) and a dark colored filtrate (II). The residue (I) having 1600 u./mg. contained 75% of the biopotency. While these steps resulted in the loss of some activity, most of the objectionable impurities which interfere with the crystallization of nystatin were removed and remained in filtrate (II).

The residue (I) was suspended in 35 ml. of a 5% calcium chloride methanol solution and shaken for 30 minutes. The mixture was filtered, yielding a white inactive solid (III) and a yellow solution (IV) containing all of the activity. The filtrate (IV) was warmed to 40° C. and 10 ml. of water added. The resulting solution was permitted to stand at room temperature for one hour, and a yellow precipitate (V) formed having a biopotency of about 650 u./mg. The precipitate (V) was removed by filtration, and the filtrate (VI) was warmed to 40° C. and clarified was a small portion of isopropanol. The solution was made cloudy by the addition of 10 ml. of water and permitted to stand at room temperature. This solution yielded a yellow crystalline material (VII) having a biopotency of 3500 u./mg. Crystalline material (VII) was removed by filtration and the resulting filtrate (VIII) again warmed to 40° C. and made cloudy with 5 ml. of water. On standing, a second crop of crystalline material (IX) was obtained which was not as yellow as the first crystalline material (VII) but had about equivalent biopotency. The crystalline materials (VII and IX) have been shown to be similar materials. The flow diagram illustrates the process described above.

The over-all yield of the above process (VII+IX) is about 65%. In practice, this process has proven to be the best process for obtaining crystalline material of exceptionally high potency.

In the above process the addition of calcium chloride in methanol to residue (I) results in the formation of a nystatin·$CaCl_2$ complex. This complex is soluble in methanol and can be advantageously used in the preparation of crystalline nystatin of high purity and potency. The calcium chloride-nystatin complex dissociates in water yielding the desired crystalline material (VII) and (IX).

In the initial steps used in the preparation of residue (I), only a small amount of the isopropanol (or like water miscible organic solvent)-water mixture should be used, e. g., just enough to suspend and form a slurry of the crude or partially purified nystatin. The use of excessive amounts of the organic solvent-water mixture over and above that required to form a slurry results in the loss of excessive amounts of nystatin in filtrate (II). The optimum amount of water miscible organic solvent as well as the optimum amount of organic solvent-water mixture to be employed with a particular crude or partially purified nystatin concentrate can be ascertained by preliminary experimental test.

In place of calcium chloride any methanol-soluble salt can be employed to solubilize residue (I) in methanol with the bivalent metal salts and especially the alkaline earth metal salts, e. g., calcium nitrate, magnesium chloride, magnesium nitrate, barium nitrate along with their bromide and iodide salts, being generally preferred. Other methanol-soluble salts, however, such as sodium and potassium acetates and bromides and iodides can be employed to solubilize nystatin in methanol. The methanol soluble salts are also soluble in aqueous methanol.

The nystatin-salt complexes are preferably prepared by reacting about equal molar amounts of nystatin with the methanol-soluble salt in anhydrous methanol. As pointed out above, the complexes dissociate in the presence of water yielding the salt in solution and nystatin as a precipitate. The complex, however, can be readily obtained by evaporation of the methanol or by addition of an organic solvent such as acetone, ethylacetate and the like to the methanol solution, thereby precipitating the nystatin-salt complex. The following example will serve for illustrative purposes.

Example II

A 5 g. sample of crystalline nystatin (3450 u./mg.) was dissolved in 75 ml. of a 1% methanolic calcium chloride solution, after filtering (to remove any insoluble impurities that may be present), 5 volumes of acetone were added slowly to the filtrate. The precipitate which formed was filtered off, washed thoroughly with acetone and dried. A 75–80% yield of the nystatin-calcium chloride complex was obtained. For further purification, the calcium chloride complex prepared as above was dissolved in 0.2% methanolic calcium chloride solution (1 g./15 ml.), the solution filtered and the complex precipitated by addition of 5 volumes of acetone. The product was filtered off, thoroughly washed with dry acetone and dried.

Some properties of the resulting nystatin-calcium chloride complex prepared as above are as follows:

| | |
|---|---|
| Melting point | Decomposes |
| Bioassay u./mg. | 3100 |
| Elementary analysis: | |
| C percent | 52.19 |
| H do | 7.28 |
| N do | 1.39 |
| Ca do | 3.90 |
| Cl do | 6.71 |

This product corresponds to one calcium chloride molecule per molecule of nystatin, neutral equivalent: 1031 based on titration with acid. Its specific rotation, ultra violet absorption spectrum and infrared absorption spectrum are identical to nystatin making allowance for the increased molecular weight due to the addition of the calcium chloride molecule.

Solubility: Very good solubility in methanol and dimethylformamide; some solubility in ethanol, isopropanol, propanol, butanol and propylene glycol; less soluble in other common organic solvents; dissociates in water.

In a similar manner other nystatin-salt complexes can be prepared by replacing the calcium chloride with other methanol soluble salts. Illustrative examples include nystatin complexes formed with magnesium chloride, barium nitrate, sodium acetate, potassium bromide, etc. The complexes while useful as a means for obtaining nystatin of high purity, can also be employed where antifungal agents or compositions characterized by nystatin activity are desired. For internal use the salts in the nystatin complex should be selected from the substantially non-toxic methanol soluble salts, the complex formed with calcium chloride being one of the preferred.

During our investigations we also discovered that a nystatin product more readily soluble and of greater solubility could be obtained by precipitating nystatin from a solution of a nystatin-salt complex in methanol provided the pH of the methanol solution was adjusted to about 4.5 to 6 before addition of water. In general this process involves dissolving nystatin, e. g., having a potency of around a 1000–2500 u./mg., in a methanolic solution of a methanol soluble salt, adjusting the pH of the resulting nystatin-salt complex solution to about 4.5 to 6 by addition of acidic material, filtering the acidic solution to insure the removal of any insoluble material, and then adding sufficient water to the filtrate to decompose i. e., dissociate, the complex and precipitate nystatin, which is then slurried in water and lyophilized. Any acidic material (e. g., inorganic and organic acids) which is both methanol and water soluble can be employed to adjust the pH of the methanol solution. Ordinarily the use of mineral acids such as HCl with a pH adjustment to about 5, is generally preferred. The nystatin product obtained by this process is more readily soluble and of greater solubility in solvents such as ethanol, the propanols, propylene glycol, etc. These characteristics are of particular importance as they make it readily possible to obtain higher concentrations of nystatin in these and like solvents including aqueous mixtures of the same such as 70% ethanol, 70% propanol and 30% propylene glycol. The following detailed example will serve for illustrative purposes.

*Example III*

Prepare a solution of 2% calcium chloride in methanol (w./v.). Dissolve nystatin in the calcium chloride solution using 15 liters of solution per 1 kilo of nystatin and adjust the pH of the resulting solution to about 5.0±0.2 by addition of a 1:1 mixture of concentrated hydrochloric acid in methanol. Agitate for about four hours. Add ¼ volume of water (based on the volume of solution) over one-half hour with constant agitation while maintaining the pH at about 5. Agitate an additional one-half hour. Add a diatomaceous filter aid (e. g., Hyflo) using about 0.4 kilo of filter aid per kilo of nystatin. Agitate the resulting mixture and then filter. Wash the resulting filter cake with 75% methanol using 4 liters of 75% methanol per kilo of nystatin and combine with the previous filtrate. Add two volumes of water (based on the volume of filtrate) rapidly to the filtrate with agitation. Separate the resulting solids (nystatin) by centrifugation. Slurry in distilled water using 10 liters of water per kilogram of wet nystatin. Grind in a mill, e. g., an Epenbach mill, to reduce lumps. Shell freeze and vacuum dry. While this process results in the loss of some nystatin, it provides ready means for obtaining a substantially pure, high potency nystatin in good yield having the desired solubility characteristics noted above.

For a definition of the term unit or u./mg. of nystatin used herein see Gold, William; Stander, Herbert; and Pansy, Felix E., "Assay Methods for Nystatin," Antibiotics Annual 1953–1954, pages 195–198.

It is claimed:

1. In the process of preparing nystatin of high potency, the improvement which comprises mixing partially purified nystatin with calcium chloride in methanol, adjusting the pH of the solution to about pH 4.5–6, removing any undissolved material from the resulting solution containing nystatin in the form of a nystatin-calcium chloride complex, dissociating the complex by addition of water to the methanol solution, and recovering the resulting nystatin precipitate from the aqueous methanol.

2. In the process of preparing nystatin of high potency, the steps which comprise solubilizing partially purified nystatin in a methanol soluble salt-methanol medium and precipitating the nystatin by addition of water to the methanol solution, said methanol soluble salt being selected from the group consisting of chloride, bromide, iodide and nitrate salts of alkaline earth metals and bromide, iodide and acetate salts of alkali metals.

3. The process of claim 2 where the salt is calcium chloride.

4. In the process of preparing nystatin of high potency, the step which comprises reacting partially purified nystatin with a methanol soluble salt in methanol to form a methanol soluble nystatin-salt complex, said methanol soluble salt being selected from the group consisting of chloride, bromide, iodide and nitrate salts of alkaline earth metals and bromide, iodide and acetate salts of alkali metals.

5. The process of claim 4 where the salt is calcium chloride.

6. In the process of preparing high potency nystatin of improved solubility, the steps which comprise dissolving nystatin in a methanolic solution of a methanol soluble salt, adjusting the pH of the resulting solution to about 4.5 to 6, and precipitating nystatin by addition of water to the acidic methanol solution, said methanol soluble salt being selected from the group consisting of chloride, bromide, iodide and nitrate salts of alkaline earth metals and bromide, iodide and acetate salts of alkali metals.

7. The process of claim 6 where the methanol soluble salt is calcium chloride.

8. The process of claim 6 where the methanol soluble salt is calcium chloride and the pH is adjusted to about pH 5.

9. The process of preparing crystalline nystatin of high potency which comprises suspending partially purified nystatin in a small amount of an isopropanol-water mixture, filtering the resulting slurry, suspending the residue in a methanol soluble salt methanol solution, filtering the resulting solution containing the nystatin in the form of a methanol soluble nystatin·salt complex, adding sufficient water to the filtrate to dissociate the complex, and recovering the resulting nystatin precipitate, said methanol soluble salt being selected from the group consisting of chloride, bromide, iodide and nitrate salts of alkaline earth metals and bromide, iodide and acetate salts of alkali metals.

10. The process of preparing nystatin of high potency which comprises suspending impure crude nystatin in a small amount of about a 50% isopropanol-water mixture, adding sufficient acid to lower the pH of the resulting slurry to about 6, filtering the mixture, dissolving the residue in a calcium chloride methanol solution, filtering the resulting nystatin·calcium chloride complex solution, adding sufficient water to the nystatin·calcium chloride complex solution to make the solution cloudy and recovering the resulting nystatin precipitate.

References Cited in the file of this patent

UNITED STATES PATENTS

| | | |
|---|---|---|
| 2,446,102 | Peck | July 27, 1948 |
| 2,474,758 | Peck | July 28, 1949 |
| 2,482,055 | Duggar | Sept. 13, 1949 |
| 2,640,842 | Weidenheimer | June 2, 1953 |

FOREIGN PATENTS

| | | |
|---|---|---|
| 714,189 | Great Britain | Aug. 24, 1954 |

OTHER REFERENCES

Regna et al.: JACS, September 1941, vol. 93, p. 4212.

Dutcher et al.: Article in "Antibiotics Annual, 1953–54," pp. 191–194, publ. December 1953, by Med. Encycl. Inc., N. Y. C.